(12) United States Patent
Aso

(10) Patent No.: US 12,709,150 B2
(45) Date of Patent: Aug. 18, 2026

(54) VEHICLE

(71) Applicant: ISUZU MOTORS LIMITED, Tokyo (JP)

(72) Inventor: Mitsuhiro Aso, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 279 days.

(21) Appl. No.: 18/690,191

(22) PCT Filed: Sep. 26, 2022

(86) PCT No.: PCT/JP2022/035767
§ 371 (c)(1),
(2) Date: Mar. 7, 2024

(87) PCT Pub. No.: WO2023/054276
PCT Pub. Date: Apr. 6, 2023

(65) Prior Publication Data

US 2024/0239181 A1 Jul. 18, 2024

(30) Foreign Application Priority Data

Sep. 28, 2021 (JP) ................................ 2021-157385

(51) Int. Cl.
*B60K 7/00* (2006.01)

(52) U.S. Cl.
CPC .... *B60K 7/0007* (2013.01); *B60K 2007/0092* (2013.01)

(58) Field of Classification Search
CPC .......... B60K 7/0007; B60K 2007/0092; B60K 2007/0038; B60K 7/00; B60K 11/04
See application file for complete search history.

(56) References Cited

U.S. PATENT DOCUMENTS 5,465,806 A * 11/1995 Higasa .................... B60L 50/51 180/242
8,733,483 B2 * 5/2014 Yamamoto ........... B60K 7/0007 180/65.6

(Continued)

FOREIGN PATENT DOCUMENTS

CN 101121394 A 10/2010
CN 207328119 U * 5/2018

(Continued)

OTHER PUBLICATIONS

CN-207328119-U English Translation (Year: 2018).*

(Continued)

*Primary Examiner* — Michael T. Walsh
(74) *Attorney, Agent, or Firm* — PROCOPIO, CORY, HARGREAVES & SAVITCH LLP

(57) ABSTRACT

A vehicle includes a plurality of in-wheel motors respectively accommodated in a plurality of wheels of the vehicle. Each the in-wheel motor of the plurality of in-wheel motors includes a rotor fixed to each wheel of the plurality of wheels that rotates together respectively with the wheel of the plurality of wheels, a stator provided to an inner side of the rotor and rotates the rotor by generating a magnetic force while being fixed to the vehicle, and a shaft fixed to the stator on a rotation axis of the rotor in the stator. The stator includes a coil, and a connector provided on an inner surface of the stator in a vehicle width direction of the vehicle and connected to a cable for supplying electric power to the coil. The plurality of wheels includes a plurality of front wheels for changing a direction of the vehicle.

7 Claims, 6 Drawing Sheets

(56) References Cited

U.S. PATENT DOCUMENTS

2004/0263099 A1* 12/2004 Maslov .................. B60L 50/20
318/400.24
2007/0096586 A1 5/2007 Cros et al.
2007/0188125 A1 8/2007 Shepard
2007/0234559 A1* 10/2007 Tokuda ................ B60K 7/0007
140/92.1
2008/0035399 A1 2/2008 Satoshi et al.
2012/0247843 A1 10/2012 Oriet
2017/0085149 A1* 3/2017 Osterlaenger ............ H02K 7/14
2017/0110933 A1 4/2017 Michel
2021/0362585 A1 11/2021 Yada et al.

FOREIGN PATENT DOCUMENTS

CN 215871090 U * 2/2022
DE 102019209254 A1 1/2020
JP H03-031029 A 2/1991
JP 2005-237176 A 9/2005
JP 2014189107 A * 10/2014
JP 2015137065 A * 7/2015
JP 2016088269 A * 5/2016
JP 2020104766 A * 7/2020
JP 2020-128140 A 8/2020
JP 2020-157837 A 10/2020
KR 2012-0009969 A 7/2012
WO WO-2017175409 A1 * 10/2017 ............... B60G 3/06

OTHER PUBLICATIONS

JP-2016088269-A English Translation (Year: 2016).*
WO-2017175409-A1 English Translation (Year: 2017).*
CN-215871090-U English Translation (Year: 2022).*
JP-2015137065-A English Translation (Year: 2015).*
JP-2020104766-A English Translation (Year: 2020).*
JP-2014189107-A English Translation (Year: 2014).*
Patent Cooperation Treaty, International Search Report, Application No. PCT/JP2022/035767, dated Dec. 6, 2022, in 4 pages.

* cited by examiner

UP
REAR
FRONT
14L
13L
11
12
2
21
22
223
224
222

T
S
14
13
4
3
LEFT
RIGHT 14R
13R
1

VEHICLE

CROSS-REFERENCE TO RELATED APPLICATIONS

The present application is a U.S. National Stage entry of PCT Application number PCT/JP2022/035767, filed on Sep. 26, 2022, which claims priority under 35 U.S.C. § 119(a) to Japanese Patent Application No. 2021-157385, filed on Sep. 28, 2021, contents of which are incorporated herein by reference in their entirety.

TECHNICAL FIELD

The present disclosure relates to a vehicle.

BACKGROUND OF THE INVENTION

Conventionally, a vehicle is provided with an in-wheel motor, which is an outer rotor type of motor. Patent Document 1 discloses a vehicle provided with wheels that include wheel members accommodating in-wheel motors, which are outer rotor type of electric motors.

PRIOR ART

Patent Document

Patent Document 1: Japanese Unexamined Patent Application Publication No. 2020-157837

BRIEF DESCRIPTION OF THE INVENTION

Problem to be Solved by the Invention

When a vehicle is provided with an in-wheel motor, which is an outer rotor type of motor, it is necessary to provide a connector to which a cable for supplying electric power to a coil is connected.

As a front wheel moves left and right by steering, when a connector is provided at the same position as those in a rear wheel, a cable tends to interfere with a component of a vehicle when the front wheel moves left and right by steering.

The present disclosure focuses on this point, and an object thereof is to provide a vehicle including an in-wheel motor whose cable is less likely to interfere with a component in the vehicle.

Means for Solving the Problems

A first aspect of the present disclosure provides a vehicle that includes a plurality of in-wheel motors that are accommodated in a plurality of wheels of the vehicle, wherein the in-wheel motor includes a rotor fixed to the wheel and rotates together with the wheel, and a stator provided to an inner side of the rotor and rotates the rotor by generating magnetic force while being fixed to the vehicle, the stator includes a coil, and a connector provided on an inner surface of the stator in a vehicle width direction of the vehicle and connected to a cable for supplying electric power to the coil, the vehicle includes, as the plurality of wheels a plurality of front wheels for changing a direction of the vehicle in a left-right direction by steering the vehicle, and a plurality of rear wheels that do not change the direction of the vehicle in the left-right direction by steering the vehicle, wherein the plurality of in-wheel motors are accommodated in the plurality of wheels in a state where a position of the connector, provided in the stator of the in-wheel motor accommodated in the front wheel, in the circumferential direction of the stator is different from a position of the connector, provided in the stator of the in-wheel motor accommodated in the rear wheel, in the circumferential direction of the stator.

Further, the plurality of the cables may be connected to the connector, the in-wheel motors accommodated in the plurality of front wheels may be provided with the connectors such that the plurality of cables are aligned in a height direction of the vehicle, and the in-wheel motors accommodated in the plurality of rear wheels may be provided with the connectors such that the plurality of cables are aligned in a front-rear direction of the vehicle.

Furthermore, the stator may further include an inlet, provided on the inner surface, into which a heat transfer medium that exchanges heat with the coil flows, and an outlet, provided in the vicinity of the inlet in the circumferential direction on the inner surface, from which the heat transfer medium flowing into the inlet flows out, wherein the plurality of in-wheel motors may be provided such that the inlet and the outlet are positioned higher than a center of the stator in a height direction of the vehicle.

Moreover, the plurality of in-wheel motors may be accommodated in the plurality of wheels such that the outlet is positioned higher than the inlet in the height direction.

In addition, the plurality of in-wheel motors accommodated in the plurality of front wheels may be provided such that positional relationships among the connector, the inlet, and the outlet in the front wheels are the same when the in-wheel motors are viewed from inner sides of the plurality of front wheels.

Further, the plurality of in-wheel motors accommodated in the plurality of rear wheels may be provided such that positional relationships among the connector, the inlet, and the outlet in the rear wheels are the same when the in-wheel motors are viewed from inner sides of the plurality of rear wheels.

Furthermore, the vehicle may further include a first tube that is connected to the inlet, a second tube that is connected to the outlet, and a support component that supports the in-wheel motor, wherein the support component may include a knuckle extending in a height direction of the vehicle and supporting the front wheel, and a shock absorber extending in a height direction of the vehicle and absorbing vibration of the vehicle, wherein the first tube and the second tube may be disposed so as to pass through a space between the knuckle and the shock absorber, and a plurality of the cables may extend along a direction parallel to an extending direction of the first tube and the second tube passing through the space.

Moreover, the vehicle may further include a first tube that is connected to the inlet, a second tube that is connected to the outlet, and a support component that supports the in-wheel motor, wherein the support component may include a knuckle extending in a height direction of the vehicle and supporting the front wheel, and a shock absorber extending in a height direction of the vehicle and absorbing vibration of the vehicle, wherein a plurality of the cables may be arranged to pass through a space between the knuckle and the shock absorber, and the first tube and the second tube may extend along a direction parallel to an extending direction of the plurality of the cables passing through the space.

Effect of the Invention

According to the present disclosure, in a vehicle including an in-wheel motor, a cable is less likely to interfere with a component in the vehicle.

DESCRIPTION OF EMBODIMENTS

[Overview of Vehicle S]

Figures 1A, 1B, 1C:
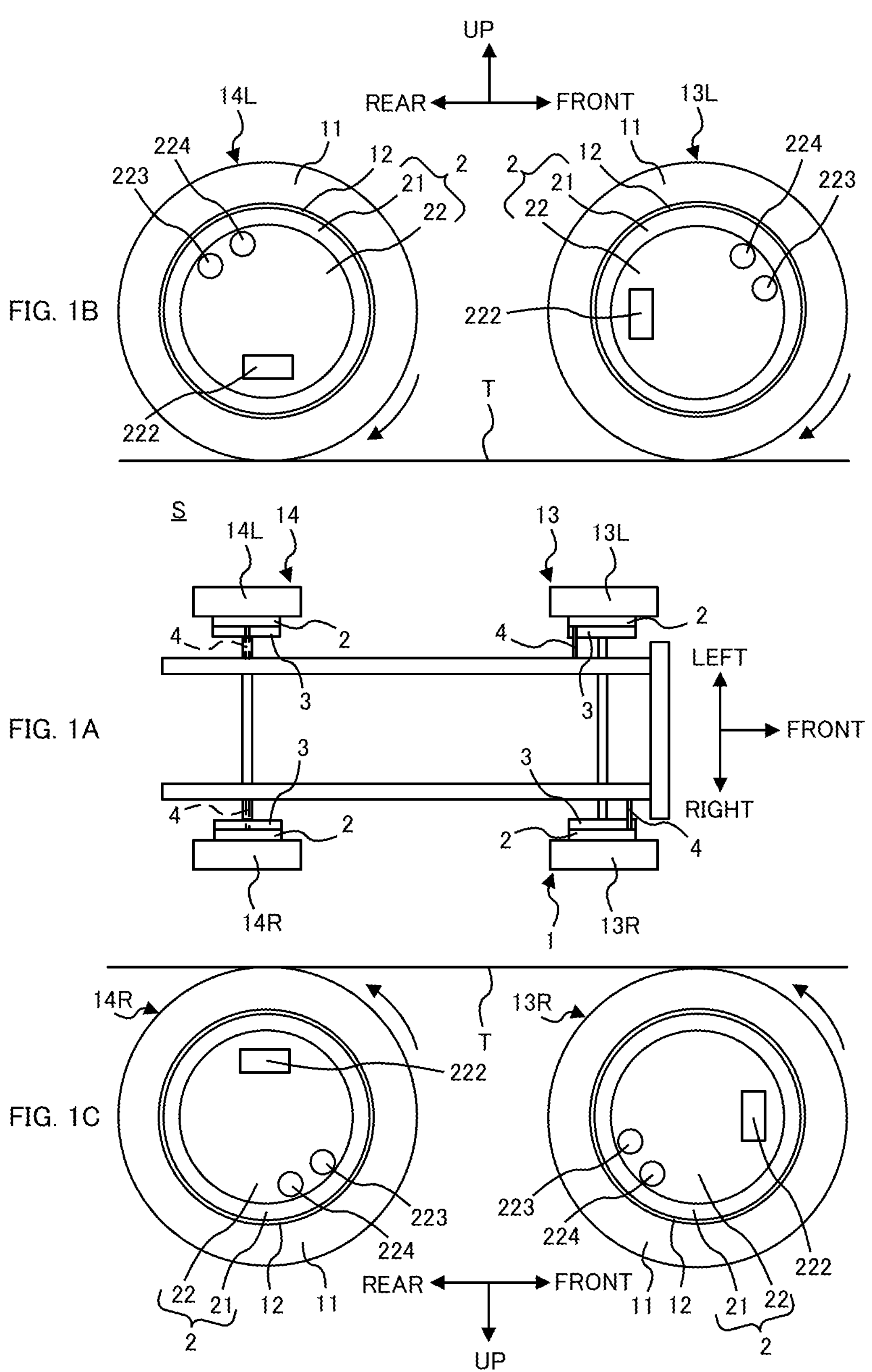
FIG. 1A shows a configuration of the vehicle.
FIG. 1B shows a state where a left front wheel and a left rear wheel of the vehicle shown in FIG. 1A are viewed from the inner side of the vehicle in the vehicle width direction of the vehicle.
FIG. 1C shows a state where a right front wheel and a right rear wheel of the vehicle shown in FIG. 1A are viewed from the inner side of the vehicle in the vehicle width direction of the vehicle.

FIGS. 1A to 1C shows a state where in-wheel motors 2 are provided in a vehicle S. FIG. 1A shows a configuration of the vehicle S. FIG. 1B shows a state where a left front wheel 13L and a left rear wheel 14L of the vehicle S shown in FIG. 1A are viewed from the inner side of the vehicle S in the vehicle width direction of the vehicle S. FIG. 1C shows a state where a right front wheel 13R and a right rear wheel 14R of the vehicle S shown in FIG. 1A are viewed from the inner side of the vehicle S in the vehicle width direction of the vehicle S. It should be noted that FIGS. 1B and 1C are depicted symmetrically with respect to the ground T in the height direction of the vehicle S.

The vehicle S includes a plurality of wheels 1, a plurality of in-wheel motors 2, a plurality of support components 3, and a plurality of cables 4. The wheel 1 includes a tire 11 and a wheel member 12. The wheel member 12 is an annular component provided inside the tire 11.

The vehicle S includes a plurality of front wheels 13 and a plurality of rear wheels 14 as the plurality of wheels 1. The plurality of front wheels 13 are wheels that change the left-right direction of the vehicle S by steering the vehicle S. The plurality of front wheels 13 are provided to the front portion of the vehicle S in its front-rear direction. The plurality of rear wheels 14 are wheels that do not change the left-right direction of the vehicle S by steering the vehicle S. The plurality of rear wheels 14 are provided to the rear portion of the vehicle S in its front-rear direction.

The vehicle S includes a left front wheel 13L and a right front wheel 13R as the plurality of front wheels 13. The left front wheel 13L is a front wheel provided to the left portion of the vehicle S in its vehicle width direction. The right front wheel 13R is a front wheel provided to the right portion of the vehicle S in its vehicle width direction.

The vehicle S includes a left rear wheel 14L and a right rear wheel 14R as the plurality of rear wheels 14. The left rear wheel 14L is a rear wheel provided to the left portion of the vehicle S in its vehicle width direction. The right rear wheel 14R is a rear wheel provided to the right portion of the vehicle S in its vehicle width direction.

The in-wheel motor 2 is used as a traveling motor of a hybrid vehicle or an electric vehicle (EV). The in-wheel motor 2 is an outer rotor type of motor. The in-wheel motor 2 is accommodated in the wheel 1. Specifically, the in-wheel motor 2 is accommodated in the wheel member 12.

The in-wheel motor 2 includes a rotor 21 and a stator 22. The rotor 21 is fixed to the wheel 1. Specifically, the rotor 21 is fixed to the wheel member 12. The rotor 21 rotates together with the wheel 1.

The stator 22 is provided to the inner side of the rotor 21. The stator 22 generates magnetic force while being fixed to the vehicle S, thereby causing the rotor 21 to rotate. The stator 22 is made of aluminum, for example. The stator 22 includes a coil 221 and a connector 222.

The support component 3 supports the in-wheel motor 2. The support component 3 includes a knuckle 3*a* described later, for example.

If the in-wheel motor 2 is a DC motor, the cable 4 connects a battery (not shown in figures) and the stator 22. Further, if the in-wheel motor 2 is an AC motor, the cable 4 connects an inverter (not shown in figures) and the stator 22. The cable 4 supplies electric power from the battery or inverter to the coil 221 of the stator 22. The cable 4 is connected to the connector 222 of the stator 22.

[Configurations of Vehicle S and in-Wheel Motor 2]

Figure 2:
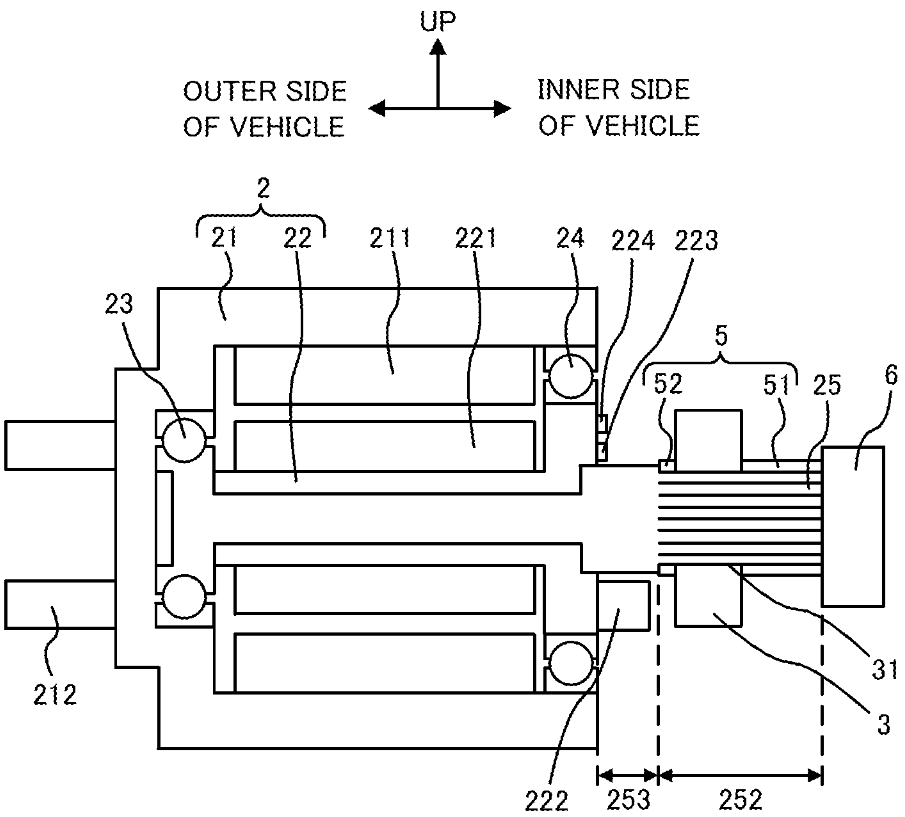
FIG. 2 is a schematic cross-sectional view of the in-wheel motor and a fixing structure for fixing the in-wheel motor to the vehicle.

FIG. 2 is a schematic cross-sectional view of the in-wheel motor 2 and a fixing structure for fixing the in-wheel motor 2 to the vehicle S.

The in-wheel motor 2 includes a first bearing 23, a second bearing 24, and a shaft 25. The first bearing 23 is provided between the rotor 21 and the stator 22 at the outer side of the stator 22 in the vehicle width direction of the vehicle S. The second bearing 24 is provided between the rotor 21 and the stator 22 at the inner side of the stator 22 in the vehicle width direction of the vehicle S. The first bearing 23 and the second bearing 24 prevent vibration of the rotor 21 when the rotor 21 rotates outside the stator 22.

The shaft 25 is fixed to the stator 22 on a rotation axis of the rotor 21 in the stator 22. The shaft 25 is made of chromium molybdenum steel, for example. With the stator 22 made of aluminum and the shaft 25 made of chromium molybdenum steel, the in-wheel motor 2 can be both strong and lightweight.

The rotor 21 includes a magnet 211 and a fastening part 212. The magnet 211 is disposed facing the coil 221 of the stator 22. The fastening part 212 is provided on an outer surface of the rotor 21 in the vehicle width direction of the vehicle S. The fastening part 212 is a portion for fixing the rotor 21 to the wheel member 12 of the wheel 1. The fastening part 212 is a stud, for example.

The stator 22 includes the coil 221 and the connector 222. The coil 221 is provided facing the magnet 211. The connector 222 is provided on an inner surface of the stator 22 in the vehicle width direction of the vehicle S. The cable 4 is connected to the connector 222.

The plurality of in-wheel motors 2 are accommodated in the plurality of wheels 1 in a state where a position of the connector 222 provided in the stator 22 of the in-wheel motor 2 accommodated in the front wheel 13 in the circumferential direction of the stator 22 is different from a position of the connector 222 provided in the stator 22 of the in-wheel motor 2 accommodated in the rear wheel 14 in the circumferential direction of the stator 22.

Specifically, as shown in FIGS. TA to 1C, in the left front wheel 13L, the connector 222 is positioned in a rear portion in the front-rear direction of the vehicle S on the inner surface of the stator 22 in the vehicle width direction of the vehicle S. In the right front wheel 13R, the connector 222 is positioned in a front portion in the front-rear direction of the vehicle S on the inner surface of the stator 22 in the vehicle width direction of the vehicle S. In the left rear wheel 14L, the connector 222 is positioned in a lower portion in the height direction of the vehicle S on the inner surface of the stator 22 in the vehicle width direction of the vehicle S. In the right rear wheel 14R, the connector 222 is positioned in a lower portion in the height direction of the vehicle S on the inner surface of the stator 22 in the vehicle width direction of the vehicle S. It should be noted that only one of i) a pair of the left front wheel 13L and the left rear wheel 14L and ii) a pair of the right front wheel 13R and the right rear wheel 14R need to have such a configuration.

Figure 3:
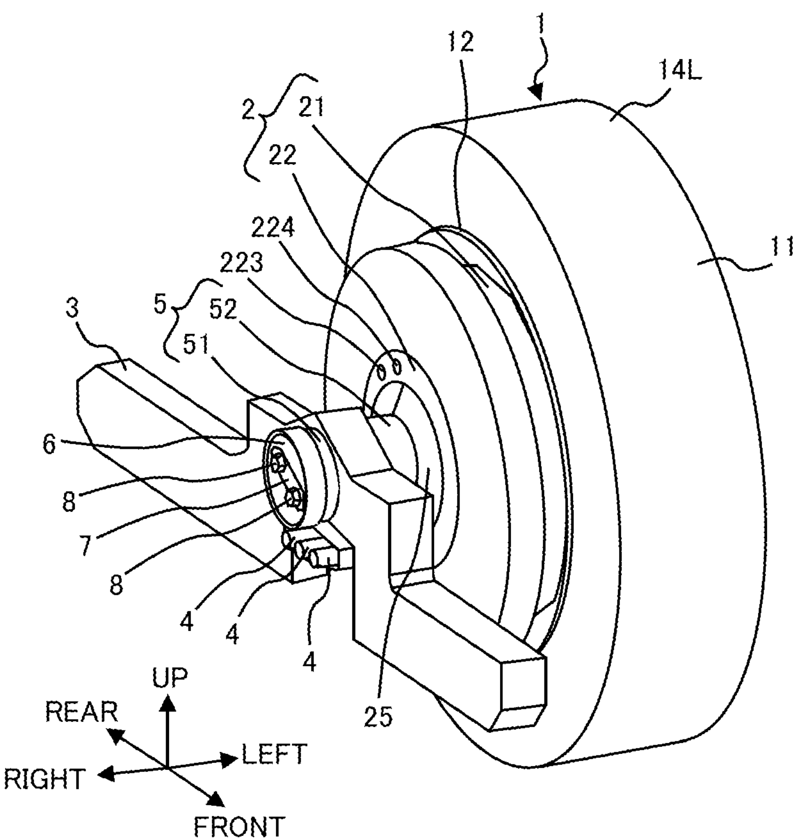
FIG. 3 shows a first example of the fixing structure for fixing the in-wheel motor to the vehicle.
Figure 4:
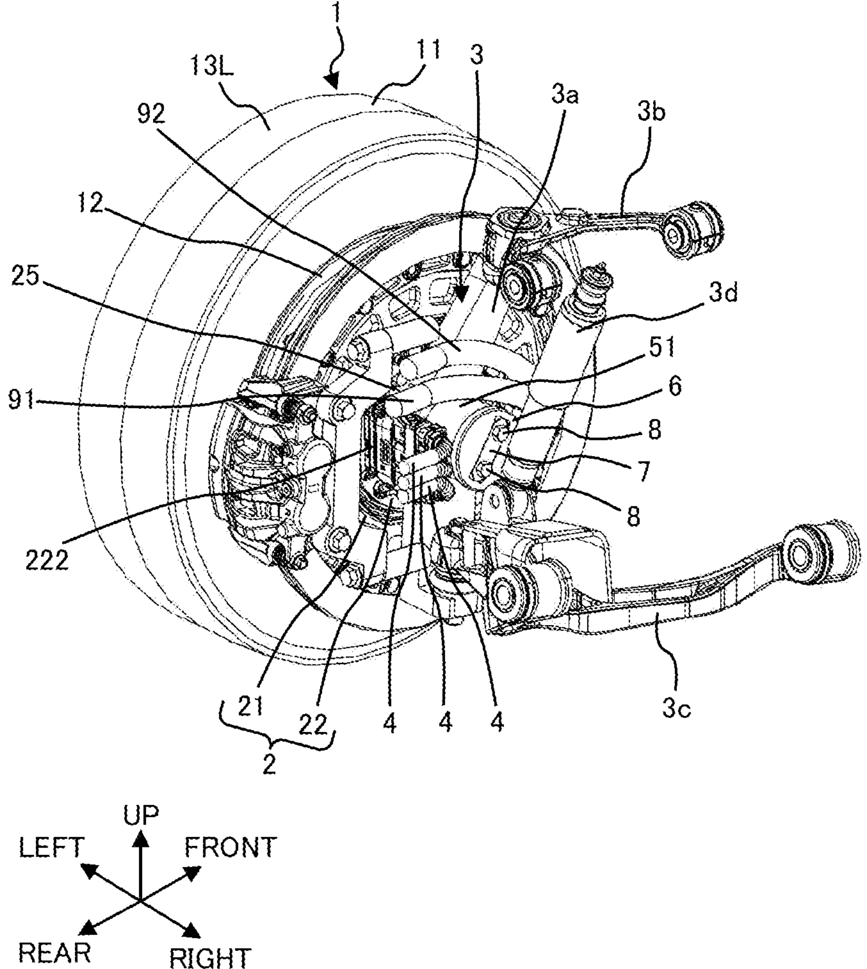
FIG. 4 shows a second example of the fixing structure for fixing the in-wheel motor to the vehicle.
Figure 5:
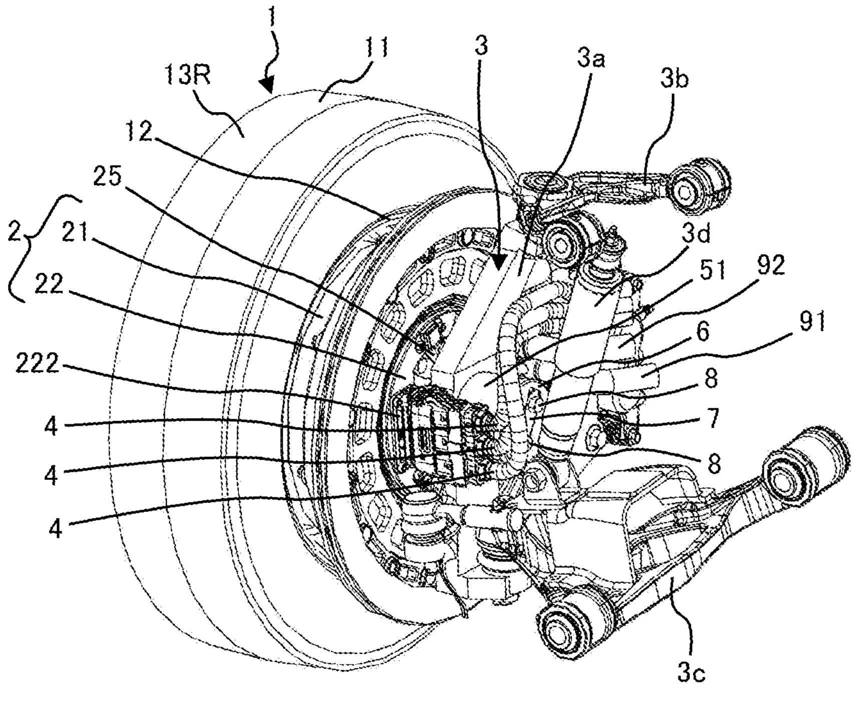
FIG. 5 shows a third example of the fixing structure for fixing the in-wheel motor to the vehicle.

FIG. 3 shows a first example of the fixing structure for fixing the in-wheel motor 2 to the vehicle S. It should be noted that the wheel 1 shown in FIG. 3 corresponds to the left rear wheel 14L shown in FIGS. TA to 1C. FIG. 4 shows a second example of the fixing structure for fixing the in-wheel motor 2 to the vehicle S. It should be noted that the wheel 1 shown in FIG. 4 corresponds to the left front wheel 13L shown in FIGS. 1A to 1C. FIG. 5 shows a third example of the fixing structure for fixing the in-wheel motor 2 to the vehicle S. It should be noted that the wheel 1 shown in FIG. 5 corresponds to the right front wheel 13R shown in FIGS. TA to 1C.

As shown in FIGS. TA to 1C and 3, in the left rear wheel 14L, the connector 222 is positioned in the lower portion on the inner surface of the stator 22 in the vehicle width direction of the vehicle S. The cable 4 connected to the connector 222 is positioned inside a concave portion provided in a lower surface of the support component 3. In the right rear wheel 14R, the connector 222 is positioned in the lower portion on the inner surface of the stator 22 in the vehicle width direction of the vehicle S, as in the left rear wheel 14L. The cable 4 connected to the connector 222 is positioned inside a concave portion provided in a lower surface of the support component 3.

On the other hand, as shown in FIGS. 1A to 1C and 4, in the left front wheel 13L, the connector 222 is positioned in the rear portion on the inner surface of the stator 22 in the vehicle width direction of the vehicle S. Further, as shown in FIGS. 1A to 1C and 5, in the right front wheel 13R, the connector 222 is positioned in the front portion on the inner surface of the stator 22 in the vehicle width direction of the vehicle S. Accordingly, in the left front wheel 13L, the cable 4 connected to the connector 222 is positioned behind the support component 3, as shown in FIG. 4. Furthermore, in the right front wheel 13R, the cable 4 connected to the connector 222 is positioned in front of the support component 3, as shown in FIG. 5. As a result, the cables 4 connected to the connectors 222 are not positioned below the support components 3, and so the cables 4 is less likely to interfere with the support components 3 in the left front wheel 13L and the right front wheel 13R, even if the left front wheel 13L and the right front wheel 13R change their direction to the left or right due to steering.

As shown in FIGS. 3 to 5, a plurality of cables 4 (three cables in FIGS. 3 to 5) are connected to the connector 222. As shown in FIGS. 1A to 1C, 4, and 5, the in-wheel motors 2 accommodated in the plurality of front wheels 13 are provided with the connectors 222 such that the plurality of cables 4 are aligned in the height direction of the vehicle S. In addition, as shown in FIGS. 1A to 1C and 3, the in-wheel motors 2 accommodated in the plurality of rear wheels 14 are provided with the connectors 222 such that the plurality of cables 4 are aligned in the front-rear direction (in other words, the horizontal direction) of the vehicle S.

In the vehicle S, the plurality of in-wheel motors 2 are accommodated in the plurality of front wheels 13 and the plurality of rear wheels 14 in this manner, and so a specific cable 4 among the three cables 4 in the left front wheel 13L and the right front wheel 13R is not pulled due to steering even if the left front wheel 13L and the right front wheel 13R change their direction to the left or right due to steering. Thus, deformations are distributed by the three cables 4, which improves durability of the cables 4. On the other hand, in the rear wheel 14, the plurality of cables 4 are arranged in the front-rear direction of the vehicle S below the support component 3, and so a space for mounting various members can be secured above the support component 3.

As shown in FIGS. 4 and 5, the support component 3 includes the knuckle 3*a*, a suspension upper arm 3*b*, a suspension lower arm 3*c*, and a shock absorber 3*d*. The knuckle 3*a* is a component that supports the wheel 1. The knuckle 3*a* extends in the height direction of the vehicle S. A hole 31 described later is formed in the knuckle 3*a*.

The suspension upper arm 3*b* is an upper arm constituting a suspension. One end of the suspension upper arm 3*b* is connected to an upper end of the knuckle 3*a*. The suspension upper arm 3*b* extends between the upper end of the knuckle 3*a* and a vehicle body (not shown in figures).

The suspension lower arm 3*c* is a lower arm constituting the suspension. The suspension lower arm 3*c* is provided below the suspension upper arm 3*b*. One end of the suspension lower arm 3*c* is connected to a lower end of the knuckle 3*a*. The suspension lower arm 3*c* extends between the lower end of the knuckle 3*a* and the vehicle body (not shown in figures).

The shock absorber 3*d* is a component that absorbs vibration of the vehicle S. The shock absorber 3*d* extends in the height direction of the vehicle S. The shock absorber 3*d* is provided between the suspension upper arm 3*b* and the suspension lower arm 3*c*. A lower end of the shock absorber 3*d* is connected to the suspension lower arm 3*c*. The shock absorber 3*d* extends between the suspension lower arm 3*c* and the vehicle body (not shown in figures).

As shown in FIG. 4, in the left front wheel 13L, the cable 4 extends towards the rear of the vehicle S without passing between the suspension upper arm 3*b* and the shock absorber 3*d*. Also, in a state where the left front wheel 13L faces the front, the cable 4 is bent towards the rear in a space behind the suspension upper arm 3*b* and the shock absorber 3*d*. Therefore, even if the left front wheel 13L changes its direction to either the left or right, the cable 4 is not subjected to excessive stress.

As shown in FIG. 5, in the right front wheel 13R, the cable 4 passes between the suspension upper arm 3*b* and the shock absorber 3*d* and extends towards the rear of the vehicle S. Also, in a state where the right front wheel 13R faces the front, the cable 4 is bent in a space between the suspension upper arm 3*b* and the shock absorber 3*d*. Therefore, even if the right front wheel 13R changes its direction to either the left or right, the cable 4 is not subjected to excessive stress.

[Cooling Water Channel]

The coil 221 of the stator 22 is subjected to high temperature, and so it is desirable to be cooled. As an example, the stator 22 has a channel through which a heat transfer medium (for example, cooling water) flows. The stator 22 includes an inlet 223 serving as an inlet of the channel and an outlet 224 serving as an outlet of the channel. The shorter distance between the inlet 223 and the outlet 224 in the circumferential direction of the stator 22 is separated by a wall. The heat transfer medium flows in from the inlet 223 and flows out from the outlet 224 after exchanging heat with the coil 221 by flowing between the longer distance between the inlet 223 and the outlet 224 in the circumferential direction of the stator 22 (most of the outer periphery of the stator 22), which serves as the channel. The inlet 223 is provided on the inner surface of the stator 22 in the vehicle width direction of the vehicle S.

As shown in FIGS. 1A to 1C, the outlet 224 is provided in the vicinity of the inlet 223 in the circumferential direction of the stator 22 on the inner surface of the stator 22 in the vehicle width direction of the vehicle S. The plurality of in-wheel motors 2 are provided such that the inlet 223 and the outlet 224 are positioned above the center of the stator 22 in the height direction of the vehicle S. In the vehicle S, the plurality of in-wheel motors 2 are accommodated in the plurality of wheels 1 such that the inlet 223 and the outlet 224 are disposed in a manner where an upward movement of the heat transfer medium, which is heated and lightened by heat exchange with the coil 221, is utilized to compensate for pressure loss. Therefore, the pressure of a pump through which the heat transfer medium flows can be reduced.

Further, the plurality of in-wheel motors 2 are accommodated in the plurality of wheels 1 such that the outlet 224 is positioned higher than the inlet 223 in the height direction of the vehicle S. In the vehicle S, the plurality of in-wheel motors 2 are accommodated in the plurality of wheels 1 such that the inlet 223 and the outlet 224 are disposed in this manner, and so the upward movement of the heat transfer medium is utilized to further compensate for pressure loss. Therefore, the pressure in the pump through which the heat transfer medium flows can be further reduced.

Specifically, as shown in FIGS. TA to 1C, in the left front wheel 13L, the inlet 223 and the outlet 224 are positioned in the upper front portion on the inner surface of the stator 22 in the vehicle width direction of the vehicle S. In the right front wheel 13R, the inlet 223 and the outlet 224 are positioned in the upper rear portion on the inner surface of the stator 22 in the vehicle width direction of the vehicle S. In the left rear wheel 14L, the inlet 223 and the outlet 224 are positioned in the upper rear portion on the inner surface of the stator 22 in the vehicle width direction of the vehicle S. In the right rear wheel 14R, the inlet 223 and the outlet 224 are positioned in the upper front portion on the inner surface of the stator 22 in the vehicle width direction of the vehicle S.

In this manner, the plurality of in-wheel motors 2 accommodated in the plurality of front wheels 13 are provided such that the positional relationships among the connector 222, the inlet 223, and the outlet 224 in the plurality of front wheels 13 are the same when the in-wheel motors 2 are viewed from the inner sides of the plurality of front wheels 13 (see FIGS. TA to 1C). In the vehicle S, the in-wheel motor 2 having the same shape can be used for the plurality of front wheels 13 in this manner. Such a configuration solves the conventional problem of having to provide motors of different shapes for the right and left front wheels (for example, motors that are symmetrical to each other) and makes it possible to make components common, for example.

Similarly, the plurality of in-wheel motors 2 accommodated in the plurality of rear wheels 14 are provided such that the positional relationships among the connector 222, the inlet 223, and the outlet 224 in the plurality of rear wheels 14 are the same when the in-wheel motors 2 are viewed from the inner sides of the plurality of rear wheels 14. In the vehicle S, in-wheel motors 2 having the same shape can be used for the plurality of rear wheels 14.

Furthermore, as shown in FIGS. 4 and 5, the vehicle S includes a first tube 91 and a second tube 92. The first tube 91 is connected to the inlet 223. The second tube 92 is connected to the outlet 224. As shown in FIG. 4, i) the first tube 91 and the second tube 92 are disposed so as to pass through a space between the knuckle 3*a* and the shock absorber 3*d*, and ii) the plurality of cables 4 extend along a direction parallel to an extending direction of the first tube 91 and the second tube 92 in an area where the first tube 91 and the second tube 92, passing through the space, extend from the space. Such a configuration allows the first tube 91, the second tube 92, and the cables 4 to be disposed efficiently.

Moreover, as shown in FIG. 5, i) the plurality of cables 4 are disposed so as to pass through the space between the knuckle 3*a* and the shock absorber 3*d*, and ii) the first tube 91 and the second tube 92 extend along a direction parallel to an extending direction of the plurality of cables 4 in an area where the plurality of cables 4, passing through the space, extend from the space. Such a configuration allows the first tube 91, the second tube 92, and the cables 4 to be disposed efficiently. It should be noted that the first tube 91, the second tube 92, and the plurality of cables 4 may extend in a vertical plane, for example. The first tube 91, the second tube 92, and the plurality of cables 4 need only have such parallel sections at least partially.

It should be noted that the inlet 223 and the outlet 224 are a plurality of openings provided at respective ends of the channel, and either of the plurality of openings may be used as the inlet 223 or the outlet 224. As shown in FIGS. 1 A to 1C, in all the wheels 1, the positional relationships between the connector 222 and the plurality of openings are the same. Therefore, in the vehicle S, in-wheel motors 2 having the same shape can be accommodated in all the wheels 1, thus improving production efficiency of the vehicle S.

[Fixing Structure for Fixing in-Wheel Motor 2 to Vehicle S]

Figure 6:
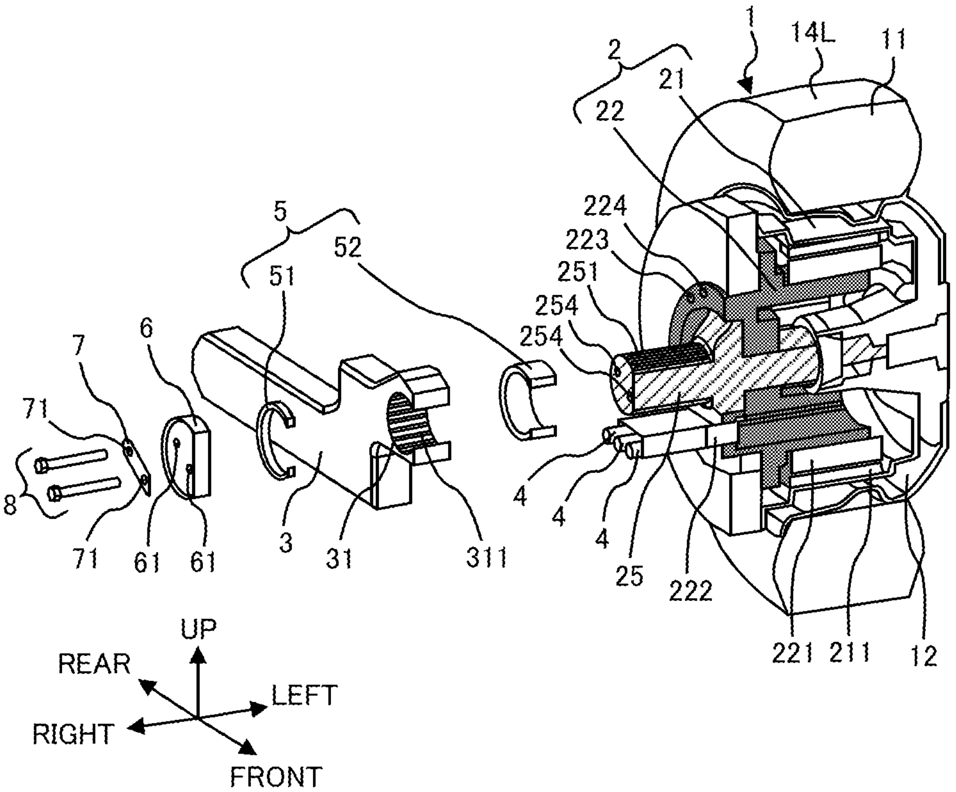
FIG. 6 is a perspective cross-sectional view showing a state where members constituting the fixing structure for fixing the in-wheel motor to the vehicle are separated.

FIG. 6 is a perspective cross-sectional view showing a state where members constituting the fixing structure for fixing the in-wheel motor 2 to the vehicle S are separated.

The shaft 25 is splined with the support component 3. A plurality of convex portions 251 are provided in at least a partial region of the shaft 25 in its longitudinal direction. The plurality of convex portions 251 are formed in the circumferential direction of the shaft 25. The convex portions 251 extend in the longitudinal direction of the shaft 25.

As shown in FIGS. 2 and 6, the shaft 25 includes a first region 252, a second region 253, and a plurality of holes 254. The first region 252 is a region having a plurality of convex portions 251. The second region 253 is connected to the first region 252. The second region 253 is connected to an end of the first region 252 on a side proximate to the stator 22 in the longitudinal direction of the shaft 25. The second region 253 has an outer diameter larger than an outer diameter of the first region 252. The holes 254 are provided in an end face of the shaft 25 in its longitudinal direction on a side where the shaft 25 is inserted in the support component 3 in a state where the shaft 25 is inserted in the hole 31 described later. A coupling member 8 described later is inserted in the hole 254.

The support component 3 has the hole 31. The shaft 25 is inserted in the hole 31. A plurality of concave portions 311 are formed in the inner peripheral surface of the hole 31. The plurality of convex portions 251 are respectively inserted in the plurality of concave portions 311. The concave portions 311 extend in the longitudinal direction of the shaft 25.

In the fixing structure for fixing the in-wheel motor 2 to the vehicle S, as described above, the plurality of convex portions 251 formed in the circumferential direction of the shaft 25 are provided in at least a partial region of the shaft 25 in its longitudinal direction, and the plurality of concave portions 311 in which the plurality of convex portions 251 are respectively inserted are formed in the inner peripheral surface of the hole 31. Such a configuration in which the shaft 25 serving as a spline shaft is fitted in the hole 31 of the support component 3 can reduce the diameter of the stator 22 while maintaining the coupling strength between the stator 22 and the support component 3, as compared with the configuration in which a plurality of studs for coupling with the support component 3 are provided to the stator 22.

The length of the first region 252 of the shaft 25 in its longitudinal direction is greater than the length of the support component 3 in the longitudinal direction of the shaft 25. The length of the first region 252 of the shaft 25 in its longitudinal direction being greater than the length of the support component 3 in the longitudinal direction of the shaft 25 allows the position of the support component 3 in a state where the plurality of convex portions 251 of the shaft 25 are inserted in the plurality of concave portions 311 of the hole 31 of the support component 3 to be different depending on the type of vehicle. Therefore, in-wheel motors 2 having the same shape can be used in a plurality of types of vehicles S having different tread widths and different suspension types, thus achieving production efficiency and cost reduction.

In one example, a shape of at least one convex portion 251 of the plurality of convex portions 251 is different from shapes of other convex portions 251, and a shape of the concave portion 311, among the plurality of concave portions 311, in which the at least one convex portion 251 is inserted is different from shapes of other concave portions 311. For example, a predetermined convex portion 251 may be formed relatively large, and a predetermined concave portion 311 formed relatively large may be provided corresponding to that convex portion 251. The convex portions 251 and the concave portions 311 are formed in the shaft 25 and in the hole 31 of the support component 3 in this manner, and so a position of the stator 22 in the circumferential direction can be determined with respect to the support component 3 at a predetermined fixed angle when the stator 22 is being fixed to the support component 3. Such a structure is suitable for fixing the in-wheel motor 2 to the wheel 1 with in-wheel motor 2 in a different orientation for each wheel 1 as shown in FIGS. 1A to 1C.

The fixing structure for fixing the in-wheel motor 2 to the vehicle S is provided with a spacer 5, a lid 6, a plate 7, and a coupling member 8. The spacer 5 is a cylindrical part (the spacer 5 is shown with a C-shape in FIG. 6, as a portion of its structure is depicted as a cross section) and is coupled to the shaft 25 in a region of the shaft 25 other than the region where the support component 3 is provided. The shaft 25 is provided with one or more spacers 5. In the present embodiment, a first spacer 51 and a second spacer 52 are provided, as the spacer 5, on respective sides of a region of the shaft 25 where the support component 3 is provided.

In a state where the shaft 25 inserted in the hole 31, the first spacer 51 is provided, at a region outside the shaft 25 in its longitudinal direction, between i) the support component 3 and ii) the end portion of the shaft 25, in its longitudinal direction, that is inserted in the support component 3. The second spacer 52 is provided between the stator 22 and the support component 3 in the longitudinal direction of the shaft 25. The vehicle S includes one or more spacers 5 in this manner, and so the position of the stator 22 with respect to the support component 3 can be adjusted in the longitudinal direction of the shaft 25. As a result, the in-wheel motor 2 can be shared in a plurality of types of vehicles S having different tread widths.

The inner diameters of one or more spacers 5 are smaller than the outer diameter of the second region 253. In the present embodiment, the inner diameters of the first spacer 51 and the second spacer 52 are smaller than the outer diameter of the second region 253. In particular, the inner diameter of the second spacer 52 is smaller than the outer diameter of the second region 253, which restricts the movement of the second spacer 52 towards the second region 253 in the longitudinal direction of the shaft 25. As an example, the in-wheel motor 2 may have a structure in which the end face of the second spacer 52 is a ring-shaped surface and the second region 253 has a ring-shaped surface parallel to the surface of this second spacer 52, such that the surfaces touch each other in an assembled state. The surfaces may be in direct contact with each other, or may be in contact with each other with an O-ring or a gasket interposed therebetween. Further, an annular groove in which the O-ring is disposed may be formed in the end face of the second spacer 52.

In a state where the shaft 25 inserted in the hole 31, the lid 6 is provided on the end face of the shaft 25 in its longitudinal direction on the side of the shaft 25 inserted in the support component 3. The lid 6 has a plurality of holes 61. The holes 61 penetrate the lid 6 in the longitudinal direction of the shaft 25 in a state where the lid 6 fixed to the shaft 25. Coupling members 8 described later are inserted in the holes 61. The lid 6 has an outer diameter larger than the inner diameters of one or more of the spacers 5. In the present embodiment, the lid 6 has an outer diameter larger than the inner diameters of the first spacer 51 and the second spacer 52.

The lid 6 provided to the shaft 25 prevents dust or the like from entering between the outer circumference of the shaft 25 and the inner circumference of the hole 31 of the support component 3. Specifically, in the present embodiment, the lid 6 sandwiches the first spacer 51 between an end surface of the lid 6 and the side surface of the support component 3. The first spacer 51 is disposed so as to block the space between the outer circumference of the shaft 25 and the inner circumference of the hole 31 of the support component 3, thus preventing dust or the like from entering between the outer circumference of the shaft 25 and the inner circumference of the hole 31 of the support component 3. In addition, the outer diameter of the lid 6 is larger than the inner diameter of the spacer 5, which restricts the movement of the spacer 5 towards the lid 6 in the longitudinal direction of the shaft 25.

Furthermore, the first spacer 51 may be disposed with a sealing member, such as a first sealing member and a second sealing member, between the support component 3 and the lid 6. The first sealing member is disposed on one end face of the first spacer 51 and the second sealing member is disposed on the other end face of the first spacer 51, for example. The first sealing member and the second sealing member are O-rings or gaskets, for example. In addition, an annular groove in which the O-ring is disposed may be formed in the end face of the first spacer 51. The first spacer 51 is disposed in a manner to be interposed between the first sealing member and the second sealing member, which makes it difficult to generate a gap between the support component 3 and the lid 6.

The plate 7 is a plate-like component. The plate 7 has a plurality of holes 71. The coupling members 8 are inserted in the holes 71. The coupling members 8 are components for coupling the lid 6 to the shaft 25. Each coupling member 8 includes a bolt inserted along a direction parallel to the axial direction of the first spacer 51, for example. In a state where the shaft 25 is inserted in the hole 31, the lid 6 comes into contact with the end surface of the shaft 25 in its longitudinal direction on the side inserted in the support component 3. The lid 6 in this state is coupled to the shaft 25 by i) placing the plate 7 on the surface of the lid 6 and inserting the coupling members 8 into the holes 71 of the plate 7, the holes 61 of the lid 6, and the holes 254 of the shaft 25 and ii) fastening the coupling members 8 to the holes 254.

Modified Example

The first spacer 51 and the second spacer 52 are provided as the spacer 5 in the above embodiment, but the present invention is not limited thereto. For example, the vehicle S may be provided with only one of the first spacer 51 and the second spacer 52 as the spacer 5. Alternatively, the first spacer 51 and the second spacer 52 may not both be provided on the vehicle S, by making the support component 3 as thick as the length of the shaft 25.

[Effects of Vehicle S According to the Present Embodiment]

In the vehicle S according to the present embodiment, the plurality of in-wheel motors 2 are accommodated in the plurality of wheels 1 in a state where a position of the connector 222 provided in the stator 22 of the in-wheel motor 2 accommodated in the front wheel 13 in the circumferential direction of the stator 22 is different from a position of the connector 222 provided in the stator 22 of the in-wheel motor 2 accommodated in the rear wheel 14 in the circumferential direction of the stator 22.

Therefore, in the vehicle S, the positions of the connectors 222 provided in the stators 22 of the in-wheel motors 2 in the circumferential direction of the stator 22 with respect to the support component 3 is different for the front wheels 13 and rear wheels 14. As a result, the cables 4 is less likely to interfere with the support components 3 in the left front wheel 13L and the right front wheel 13R, even if the left front wheel 13L and the right front wheel 13R change their direction to left or right by steering.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments of the present disclosure. Further, effects of the new exemplary embodiments brought by the combinations also have the effects of the original exemplary embodiments.

DESCRIPTION OF SYMBOLS

S: vehicle
1: wheel
11: tire
12: wheel member
13: front wheel
13L: left front wheel
13R: right front wheel
14: rear wheel
14L: left rear wheel
14R: right rear wheel
2: in-wheel motor
21: rotor
211: magnet
212: fastening part
22: stator
221: coil
222: connector
223: inlet
224: outlet
23: first bearing
24: second bearing
25: shaft
251: convex portion
252: first region
253: second region
254: hole
3: support component
31: hole
311: concave portion
3*a*: knuckle
3*b*: suspension upper arm
3*c*: suspension lower arm
3*d*: shock absorber
4: cable
5: spacer
51: first spacer
52: second spacer
6: lid
61: hole
7: plate
71: hole
8: coupling member
91: first tube
92: second tube
T: ground

The invention claimed is:

1. A vehicle comprising:

a plurality of in-wheel motors respectively accommodated in a plurality of wheels of the vehicle, wherein each in-wheel motor of the plurality of in-wheel motors includes: a rotor, of a plurality of rotors, fixed to each wheel of the plurality of wheels that rotates together respectively with the wheel of the plurality of wheels, a stator, of a plurality of stators, provided to an inner side of the rotor and rotates the rotor by generating a magnetic force while being fixed to the vehicle, and a shaft fixed to the stator on a rotation axis of the rotor in the stator, the stator includes:

a coil, of a plurality of coils, and a connector of a plurality of connectors provided on an inner surface of the stator in a vehicle width direction of the vehicle and connected to a cable of a plurality of cables for supplying electric power to the coil, the plurality of wheels includes:

a plurality of front wheels for changing a direction of the vehicle in a left-right direction by steering the vehicle, and a plurality of rear wheels that do not change the direction of the vehicle in the left-right direction by steering the vehicle, wherein each in-wheel motor of the plurality of in-wheel motors is respectively accommodated in a wheel of the plurality of wheels in a state where a position of a connector, of a plurality of connectors, provided in the stator of each in-wheel motor of the plurality of in-wheel motors respectively accommodated in a front wheel of the plurality of front wheels, in a circumferential direction of the stator is different from a position of the connector, provided in the stator of each in-wheel motor of the plurality of in-wheel motors respectively, accommodated in a rear wheel of the plurality of rear wheels, in the circumferential direction of the stator, each cable of the plurality of cables is connected respectively to each connector of the plurality of connectors, the in-wheel motors accommodated in the plurality of front wheels are provided with connectors such that each cable of the plurality of cables supplying electric power to the coil in each front wheel is aligned in a height direction of the vehicle, the in-wheel motors accommodated in the plurality of rear wheels are provided with connectors such that each cable of the plurality of cables supplying electric power to the coil in each rear wheel is aligned in a front-rear direction of the vehicle, the vehicle includes a support component that has a hole in which the shaft is inserted and supports the in-wheel motor of the plurality of in-wheel motors, a plurality of convex portions formed in a circumferential direction of the shaft are provided in at least a partial region of a longitudinal direction of the shaft, a plurality of concave portions, in which the plurality of convex portions are respectively inserted, are formed in an inner peripheral surface of the hole, a shape of at least one of the plurality of convex portions is different from a shape of other convex portions, and a shape of the concave portion of the plurality of concave portions in which the at least one convex portion is inserted is different from a shape of the other concave portions.

2. The vehicle according to claim 1, wherein the stator further includes:

an inlet, provided on the inner surface, into which a heat transfer medium that exchanges heat with the coil flows, and an outlet, provided in a vicinity of the inlet in the circumferential direction on the inner surface, from which the heat transfer medium flowing into the inlet flows out, and wherein the plurality of in-wheel motors are provided such that the inlet and the outlet are positioned higher than a center of the stator in a height direction of the vehicle.

3. The vehicle according to claim 2, wherein the plurality of in-wheel motors are accommodated in the plurality of wheels such that the outlet is positioned higher than the inlet in the height direction.

4. The vehicle according to claim 3, wherein the plurality of in-wheel motors accommodated in the plurality of front wheels are provided such that positional relationships among the connector, the inlet, and the outlet in the front wheels are the same when the in-wheel motors are viewed from inner sides of the plurality of front wheels.

5. The vehicle according to claim 3, wherein the plurality of in-wheel motors accommodated in the plurality of rear wheels are provided such that positional relationships among the connector, the inlet, and the outlet in the rear wheels are the same when the in-wheel motors are viewed from inner sides of the plurality of rear wheels.

6. The vehicle according to claim 2, further comprising:

a first tube that is connected to the inlet; and a second tube that is connected to the outlet, wherein the support component includes:

a knuckle extending in a height direction of the vehicle and supporting the front wheel, and a shock absorber extending in a height direction of the vehicle and absorbing vibration of the vehicle, and wherein the first tube and the second tube are disposed so as to pass through a space between the knuckle and the shock absorber, and the plurality of the cables extend along a direction parallel to an extending direction of the first tube and the second tube passing through the space.

7. The vehicle according to claim 2, further comprising:

a first tube that is connected to the inlet; and a second tube that is connected to the outlet, wherein the support component includes:

a knuckle extending in a height direction of the vehicle and supporting the front wheel, and a shock absorber extending in a height direction of the vehicle and absorbing vibration of the vehicle, and wherein the plurality of the cables are arranged to pass through a space between the knuckle and the shock absorber, and the first tube and the second tube extend along a direction parallel to an extending direction of the plurality of the cables passing through the space.

* * * * *